United States Patent [19]

Hake et al.

[11] Patent Number: 5,409,068
[45] Date of Patent: Apr. 25, 1995

[54] DUAL PENETRATION COMBINATION SWEEP WITH RIPPER

[75] Inventors: Kenneth A. Hake; Rodney D. Hake, both of Tipton; Mark A. Eilert, Beloit, all of Kans.

[73] Assignee: Kent Manufacturing Co., Inc., Tipton, Kans.

[21] Appl. No.: 64,636

[22] Filed: May 20, 1993

[51] Int. Cl.⁶ ............. A01B 49/00; A01B 61/04; A01B 13/14
[52] U.S. Cl. .................... 172/196; 172/271; 172/139; 172/140; 172/192; 172/700; 172/382; 172/407; 172/733; 172/740
[58] Field of Search ............... 172/192–196, 172/133, 140, 249, 271, 261, 699, 700, 382, 407, 413, 200, 721, 733, 725, 773; 111/52

[56] References Cited

U.S. PATENT DOCUMENTS

| | | | |
|---|---|---|---|
| 1,099,877 | 6/1914 | Hartig | 172/196 |
| 1,147,543 | 7/1915 | Pillow | 172/699 |
| 2,677,321 | 10/1950 | Ferguson . | |
| 3,046,917 | 7/1962 | Kasper | 172/196 |
| 3,180,431 | 4/1965 | Launder et al. . | |
| 3,642,073 | 2/1972 | Geurts . | |
| 4,015,667 | 4/1977 | Ruozi . | |
| 4,127,073 | 11/1978 | Blair . | |
| 4,204,579 | 5/1980 | Rau et al. . | |
| 4,262,751 | 4/1981 | Grear | 172/271 |
| 4,781,253 | 11/1988 | Cosson . | |
| 4,909,335 | 3/1990 | Walt, Jr. . | |
| 4,974,681 | 12/1990 | Symonds . | |
| 5,001,995 | 3/1991 | Mikkelsen . | |
| 5,040,616 | 8/1991 | Hake | 172/271 |
| 5,195,597 | 3/1993 | Yeomans . | |

FOREIGN PATENT DOCUMENTS

| | | | |
|---|---|---|---|
| 811436 | 4/1969 | Canada | 172/310 |
| 417822 | 7/1924 | Germany | 172/196 |
| 3012066 | 10/1981 | Germany | 172/382 |
| 2033192 | 5/1980 | United Kingdom | 172/196 |

Primary Examiner—Dennis L. Taylor
Assistant Examiner—Spencer Warnick
Attorney, Agent, or Firm—Litman, McMahon & Brown

[57] ABSTRACT

An agricultural plow implement includes a number of upright supports, with each support supporting a shallow tillage V-shaped sweep blade. A mounting plate is attached to the rear of each upright support and a specially adapted ripper shank, with an attached deep penetrating ripper blade, is attachable to each plate via a pair of bolts which extend through respective mounting bores in the plate. One of the bolts in each pair is a pivot bolt which provides a pivot point about which the ripper shank can swing. The other bolt is a shear pin which is designed to shear off should the ripper blade encounter an obstruction which might otherwise bend or break the ripper blade and/or the ripper shank. The ripper shank is adjustable vertically relative to the sweep blade and the ripper shank can also be pivoted 180 degrees between operative and non-operative positions when it is desired to do a sweep operation without soil ripping.

14 Claims, 2 Drawing Sheets

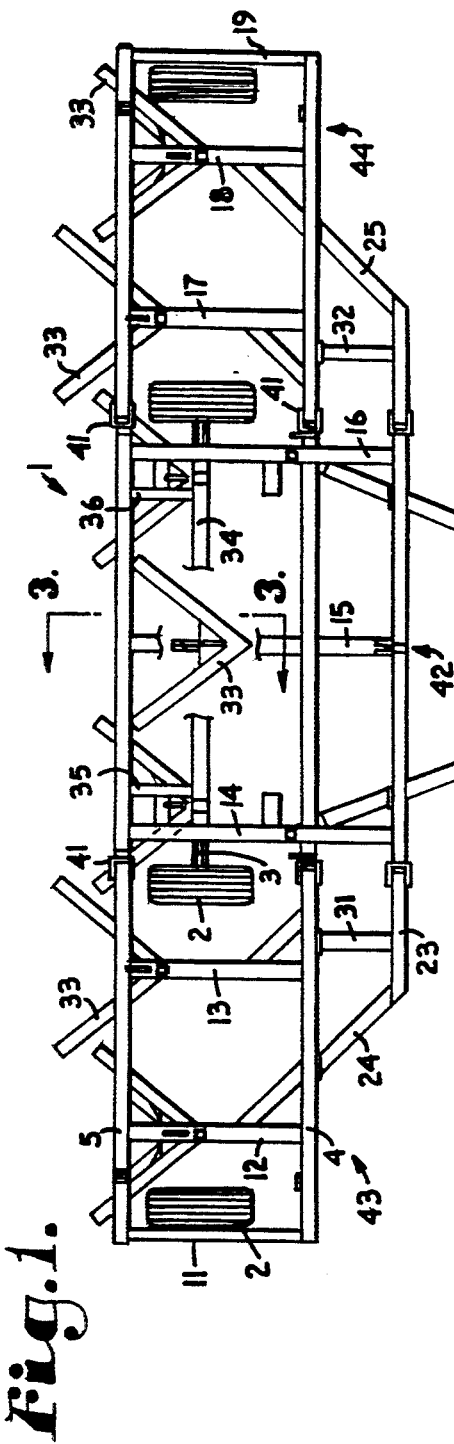
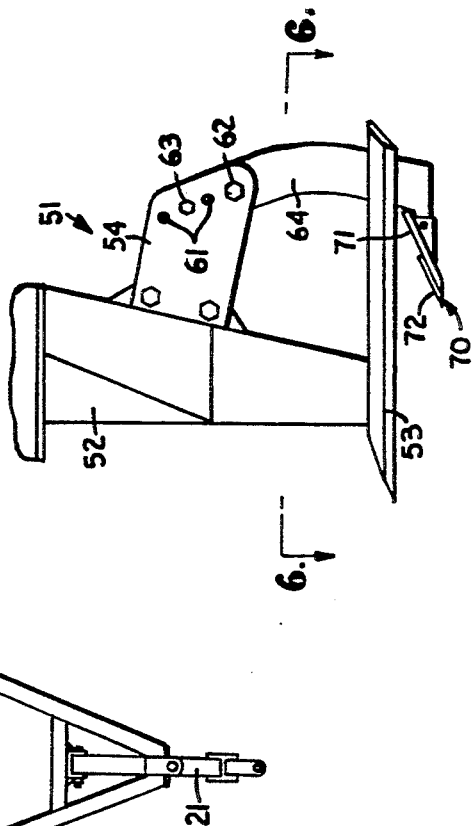
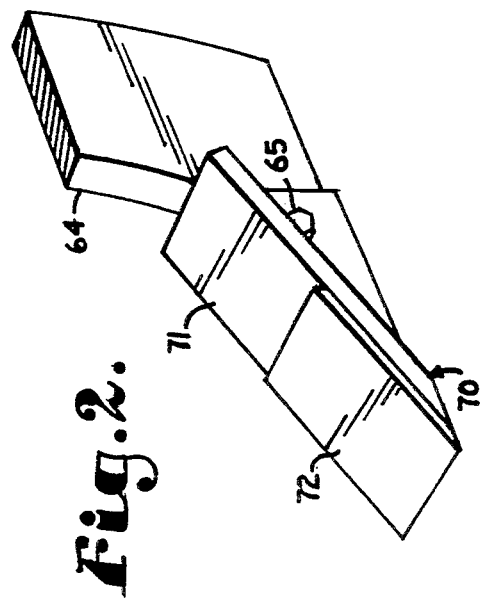

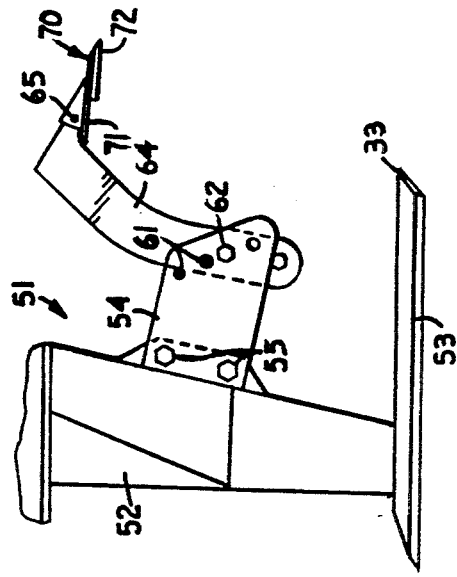
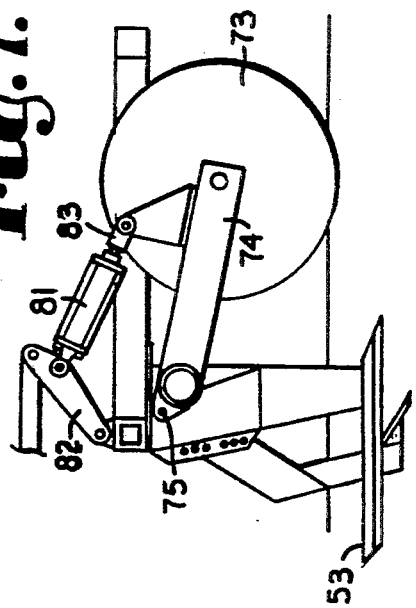
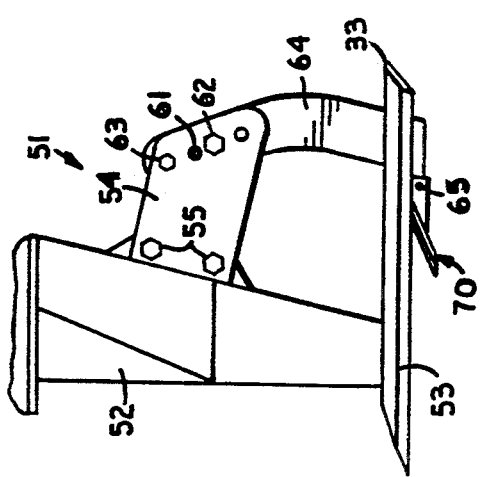
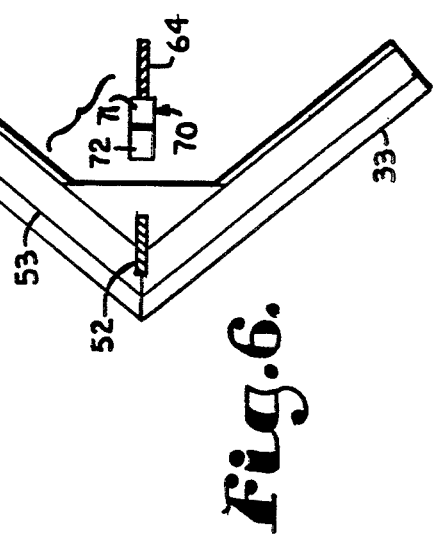

DUAL PENETRATION COMBINATION SWEEP WITH RIPPER

BACKGROUND OF THE INVENTION

1. Field of the Invention

This invention is directed to an agricultural implement which includes combination subsoil sweep blades and deep soil ripper blades and more particularly to such an implement in which each sweep and ripper blade is attached to a common upright support and where the ripper is vertically adjustable relative to the sweep blade.

2. Description of the Related Art

Recently it has been customary, particularly in relatively low moisture crop cultivation operations, such as those performed in the American Great Plains, to perform low tillage or no tillage farming operations to promote continuous surface coverage to prevent wind and water soil erosion. To perform low tillage operations, relatively wide, V-shaped sweep blades have been developed which sweep along a path below the soil surface, at a shallow depth of, for example, 2" to 6". This insures that the top surface of the soil is relatively undisturbed, except for the passage of the supports upon which the sweeps are mounted. This provides weed control with a minimal amount of soil disturbance. At the same time, particularly after harvesting during dry soil conditions, it is necessary to periodically perform deep soil fracturing operations with soil rippers which extend to a depth of from 7" to 10", in order to loosen the hardpan soil to increase moisture absorption. This soil ripping or fracturing operation is usually performed either immediately before or after the sweep operation, which entails two complete passes with tractor and plow. Often these consecutive passes are made with the same implement, but with the sweep blades exchanged for ripper blades or vice versa. It is apparent that a big savings in both time and fuel requirements could be realized if the two operations could be performed simultaneously on the same pass. Furthermore, the use of a wide sweep plow blade, plowing the soil to a depth of 2" to 6", preceding a ripper plow blade, fracturing the soil to a depth of 7" to 10", allows the ripper to perform the fracturing operation with much less energy expenditure, thus providing an additional savings in fuel costs and/or allowing the plow to be pulled with a tractor of less horsepower.

A number of previous attempts have been made to combine sweeps and rippers in a single plow implement. For example, in U.S. Pat. No. 4,909,335 to Walt, Jr., a V-shaped sweep blade is mounted on a first shank which positioned on an implement frame ahead of a second shank upon which is mounted a deep tillage tool or ripper. While this arrangement represents a substantial improvement in time and energy savings, it requires that a special implement frame be used which provides an area to mount two or three separate vertically oriented shanks arranged in tandem.

U.S. Pat. No. 4,974,681 to Symonds teaches a subsoil tine or ripper arranged beneath a sweep blade with both the tine and sweep blade attached to a single shank. However, the tine does not appear to be adjustable vertically relative to the sweep blade, and the entire implement is designed for making a single, narrow pass through a pine forest or the like. The sweep blade is apparently intended for cutting tree roots ahead of the tine.

It is clear then, that a need still exists for a combination sweep and ripper plow in which an existing plow implement frame can be adapted to have the sweep blade and the ripper blade attached to a common shank. The ripper blade should be adjustable vertically relative to the sweep blade and, preferably, the ripper blade should be readily movable to a non-operative position for sweep operations which do not require soil ripping.

SUMMARY OF THE INVENTION

In the practice of the present invention, a plow implement includes a frame to which a number of ground engaging wheels are attached. A number of longitudinally extending frame members are adapted to mount respective, vertically oriented sweep supports. At the bottom of each sweep support is attached a shallow tillage sweep blade. A mounting plate is attached to the rear of each sweep support and a plurality of mounting bores are drilled near the rear of each mounting plate. A specially adapted parabolic ripper shank, with an attached deep penetrating ripper blade, is attachable to each plate via a pair of bolts which extend through respective ones of the mounting bores. One of the bolts in each pair is a pivot attachment bolt which provides a pivot point about which the ripper shank can swing. The other bolt is a shear pin which is designed to shear off should the ripper blade encounter an obstruction which might otherwise bend or break the ripper blade and/or the ripper shank. In an alternative arrangement, the ripper shank can be pivoted upward 180 degrees to place the ripper blade in a non-operative position when it is desired to do a sweeping operation without soil ripping.

OBJECTS AND ADVANTAGES OF THE INVENTION

The principle objects and advantages of the present invention include: to provide an improved combination agricultural sweep and ripper apparatus; to provide such an apparatus in which a wide, shallow tillage sweep blade and a narrow, sub-soil ripper blade are attached to a common support; to provide such an apparatus in which the ripper blade is adjustable vertically relative to the sweep blade; to provide such an apparatus in which the ripper blade can be readily pivoted upward 180 degrees to a non-operative position; to provide such an apparatus in which the ripper blades are attached to respective ripper shanks which are, in turn, attached to the common support via a pair of bolts; to provide such an apparatus in which one of the ripper shank attachment bolts provides a pivot axis with the other bolt being a shear pin to protect the ripper blade and shank; to provide such an apparatus which provides improved efficiency and fuel economy over conventional plows; to provide such an apparatus which can be adapted to fit a conventional plow implement frame; and to provide such an apparatus which is reliable, economical to manufacture, and which is particularly well suited for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a top plan view of an implement frame incorporating a plurality of sweep supports and blades.

FIG. 2 is an enlarged, perspective view of a ripper blade and replaceable carbon tip ripper point.

FIG. 3 is an enlarged, fragmentary, cross-sectional view of a combination sweep blade and ripper blade attached to a common support shank, taken along line 3—3 of FIG. 1, and illustrating the ripper blade in a lowered position relative to the sweep blade.

FIG. 4 is an enlarged, fragmentary, cross-sectional view of a combination sweep blade and ripper blade attached to a common support shank, taken along line 3—3 of FIG. 1, and illustrating the ripper blade in a raised position relative to the sweep blade.

FIG. 5 is an enlarged, fragmentary, cross-sectional view of a combination sweep blade and ripper blade attached to a common support shank, taken along line 3—3 of FIG. 1, and illustrating the ripper blade pivoted 180 degrees to an inoperative position.

FIG. 6 is an enlarged, fragmentary, cross-sectional view of a combination sweep blade and ripper blade, taken along line 6—6 of FIG. 3, and illustrating the relative positions of the separate blades.

FIG. 7 is an enlarged side elevational view of a combination sweep and ripper with a depth adjustment gauge wheel and actuating cylinder attached.

DETAILED DESCRIPTION OF THE INVENTION

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting For example, the words "upwardly", "downwardly", "rightwardly" and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail the reference numeral 1 in FIG. 1 generally designates an agricultural implement frame. The frame 1 includes a plurality of ground engaging wheels 2 attached to respective axles 3. The wheels 2 and axles 3 support a framework comprising a pair of transversely extending frame members 4 and 5 connected via a plurality of longitudinally extending frame members 11–19. A hitch 21 is connected to the forward transverse frame member 4 via a V shaped hitch frame 22. An additional transversely extending frame member 23 is attached to the forward transverse frame member 4 via a pair of angled frame members 24 and 25, a pair of short rigidizing frame members 31 and 32, and an extension of each of the longitudinal frame members 14, 15 and 16. This arrangement provides added strength and rigidity to the frame 1.

A number of sweep plow assemblies 33 are attached to the frame 1. A center transverse support frame member 34 and an additional pair of rigidizing frame members 35 and 36 are provided to support a pair of the plow assemblies 33 in a position offset from the two center wheels 2. Portions of the frame members 15 and 34 are broken away to illustrate the centrally positioned sweep blade 33.

A number of hinges 41 are positioned in the transverse frame members 4, 5 and 23, with the hinges 41 dividing the frame 1 into a center portion 42 and a pair of outer portions 43 and 44. The hinges 41 allow the outer portions 43 and 44 to be pivoted upward to decrease the width of the frame 1 for transport trailering efficiency. A hydraulic actuating mechanism (not shown) can be provided to mechanically fold the side portions 43 and 44 upward.

Combination Sweep and Ripper

Referring to FIGS. 2–6, a combination sweep and ripper assembly in accordance with the present invention is generally designated as 51. The assembly 51 can be used to replace the sweep assemblies 33 in FIG. 1, and includes an upright sweep support 52 with a V-shaped sweep blade 53 attached to the bottom thereof. The sweep blade 53 is designed to operate at a relatively shallow soil depth of, e.g. 2" to 6" to cut weed roots below the soil surface. A ripper shank support plate 54 is attached to the rear of the support 52 via a pair of bolts 55. The support plate 54 includes a plurality of bores 61 near the rear thereof which are sized to accommodate attachment bolts 62 and 63 of a ripper shank 64. The ripper shank 64 is of a parabolic design which allows deep soil penetration with minimum horsepower requirements of the pulling equipment. The bolt 62 is preferably a solid strengthened steel bolt while the bolt 63 is a shear pin. Mounted on the front of the shank 64 via a bolt 65 is a ripper plow blade 70 which comprises a relatively narrow ripper support plate 71, best illustrated in FIG. 2. A replaceable carbon tip ripper point 72 is attached to the plate 71.

The ripper blade 70 is designed to shatter hardpan soil at a depth of from 7" to 10" to allow maximum moisture retention and to prevent wind erosion. The depth of the ripper blade 70 relative to the sweep blade 53 is adjustable via the bolt mounting bores 61 in the support plate 54. This relative depth between the ripper blade 70 and the sweep blade 53 is adjustable, for example, from 2" below the sweep 53, as shown in FIG. 4, to 4" below the sweep 53, as shown in FIG. 3.

When conditions are not right for the shattering operation, the ripper shank 64 can be readily moved to a non-operative position, as shown in FIG. 5, by merely pulling the shear pin 63 and pivoting the shank 64 180 degrees about the mounting bolt 62.

FIG. 6 illustrates the relative placement of the sweep support 52, the sweep blade 53, the ripper shank 64 and the ripper blade 70.

Referring to FIG. 7, the depth of the sweep blade 53, and, since it is directly connected, the ripper blade 70, is adjusted via a gauge wheel 73 which is attached at one end of a pivot arm 74. The other end of the pivot arm 74 is attached to the support 52 at pivot point 75. A hydraulic cylinder 81 is pivotally attached to a portion of the frame 1 via a mounting plate 82. A rod 83 is selectively extendable and retractable via the cylinder 81 to set the angle at which the gauge wheel extends from the support 52, and thus to adjust the depth at which the sweep blade 53 and the ripper blade 70 operate.

Operation

During periods when both a sweep operation and a hardpan shattering operation are desired, such as after harvest when soil conditions are relatively dry, the combination sweep and ripper assembly 51 is adjusted such that the ripper shank 64 is pivoted into an operative position, as shown in FIG. 3 or FIG. 4. The desired depth is set via the hydraulic cylinder 81 and the gauge wheel 73. The plow implement 1 is then pulled through a cultivated field by a tractor (not shown), with the sweep blades 53 cutting the weeds at a depth of from 2" to 6" while the ripper blades 70 simultaneously fracture the subsurface hardpan at a depth of from 4" to 10", depending upon the setting of the gauge wheel 73 and the positioning of the shank 64 via the bores 61.

In a preferred embodiment of the implement 1, the sweep blades 53 are 4 feet wide, allowing shallow tillage with minimum ridging and lower horsepower requirements. The sweep supports 52, and therefore the ripper shanks 64 are spaced 44" on center with 30" of frame clearance to allow large tillage widths and maximum clearance.

It is to be understood that while certain forms of the present invention have been illustrated and described herein, it is not to be limited to the specific forms or arrangement of parts described and shown.

What is claimed and desired to be secured by Letters Patent is as follows:

1. A combination sweep and ripper agricultural implement comprising:
   (a) a frame supported by ground engaging wheels and adapted to be towed by a towing vehicle;
   (b) at least one upright support attached to said frame, said upright support having front and rear surfaces;
   (c) a sweep blade attached near the bottom of said upright support;
   (d) a support plate attached directly to the rear surface of said upright support and a ripper shank attached to said support plate, said ripper shank being adjustable vertically relative to said sweep blade, said ripper shank being attached to said support plate via a pair of bolts, a first one of said bolts being an attachment bolt and the other of said bolts being a shear pin;
   (e) a ripper blade attached to said ripper shank, said ripper blade being operatively positioned below said sweep blade;
   (f) depth adjustment means attached near the front surface of said upright support to adjust the operating depth of said sweep blade and said ripper blade; and
   (g) said ripper shank is pivotable relative to said support plate about said first bolt between operative and non-operative positions.

2. A combination sweep and ripper agricultural implement comprising:
   (a) a frame supported by ground engaging wheels;
   (b) at least one generally upright support attached to said frame, said upright support having front and rear surfaces;
   (c) a sweep blade attached near the bottom of said upright support;
   (d) a support plate attached to said upright support, said support plate including a plurality of attachment bores extending therethrough;
   (e) a ripper shank attached to said support plate via a plurality of bolts extending through some of said plurality of attachment bores whereby said ripper shank is adjustable vertically by inserting said plurality of bolts in different ones of said plurality of bores; and
   (f) a ripper blade attached to said ripper shank.

3. An implement as in claim 2, wherein:
   (a) said ripper blade is operatively positioned below said sweep blade.

4. An implement as in claim 2, wherein:
   (a) said ripper blade comprises a replaceable ripper point.

5. An implement as in claim 4, wherein:
   (a) said ripper point includes a carbon tip.

6. An implement as in claim 2, and further comprising:
   (a) depth adjustment means attached near the front surface of said upright support to adjust the operating depth of both said sweep blade and said ripper blade.

7. An implement as in claim 6, wherein:
   (a) said depth adjustment means comprises a gauge wheel pivotally attached to said upright support and attached to said frame via a selectively extendable and retractable rod of a hydraulic cylinder.

8. An implement as in claim 1, wherein:
   (a) said implement includes a plurality of said upright supports with corresponding pluralities of sweep blades and ripper shanks and blades.

9. An implement as in claim 1, wherein:
   (a) said ripper shank is parabolic in shape.

10. A combination sweep and ripper agricultural implement comprising:
    (a) a frame supported by ground engaging wheels;
    (b) at least one generally upright support attached to said frame, said upright support having front and rear surfaces;
    (c) a sweep blade attached near the bottom of said upright support;
    (d) a ripper shank attached to the rear surface of said upright support;
    (e) a ripper blade attached to said ripper shank;
    (f) depth adjustment means attached near the front surface of said upright support to adjust the operating depth of said sweep blade and said ripper blade, said depth adjustment means comprising a gauge wheel pivotally attached to said upright support and attached to said frame via a selectively extendable and retractable rod of a hydraulic cylinder.

11. A combination sweep and ripper agricultural implement comprising:
    (a) a frame supported by ground engaging wheels and adapted to be towed by a towing vehicle;
    (b) at least one upright support attached to said frame, said upright support having front and rear surfaces;
    (c) a sweep blade attached near the bottom of said upright support;
    (d) a ripper shank attached to the rear surface of said upright support, said ripper shank being adjustable vertically relative to said upright support;

(e) a ripper blade attached to said ripper shank, said ripper blade being operatively positioned below said sweep blade; and (f) depth adjustment means attached near the front surface of said upright support to adjust the operating depth of said sweep blade and said ripper blade, said depth adjustment means comprising a gauge wheel pivotally attached to said upright support and attached to said frame via a selectively extendable and retractable rod of a hydraulic cylinder.

12. An implement as in claim 11, wherein:

(a) said ripper shank is attached to said support plate via a pair of bolts, a first one of said bolts being an attachment bolt and the other of said bolts being a shear pin.

13. An implement as in claim 12, wherein:

(a) said ripper shank is pivotable relative to said support plate about said first bolt between operative and non-operative positions.

14. An implement as in claim 11, wherein:

(a) said implement includes a plurality of said upright supports with corresponding pluralities of sweep blades and ripper shanks and blades.

* * * * *